Jan. 10, 1933.     R. G. F. LOEWY     1,893,709
WINDSHIELD
Filed March 11, 1931     2 Sheets-Sheet 1

INVENTOR
Raymond G. F. Loewy
BY
Wm. S. Pritchard
ATTORNEY

Jan. 10, 1933.   R. G. F. LOEWY   1,893,709
WINDSHIELD
Filed March 11, 1931   2 Sheets-Sheet 2

INVENTOR
Raymond G. F. Loewy
Wm. J. Pritchard
ATTORNEY

Patented Jan. 10, 1933

1,893,709

UNITED STATES PATENT OFFICE

RAYMOND G. F. LOEWY, OF NEW YORK, N. Y.

WINDSHIELD

Application filed March 11, 1931. Serial No. 521,745.

This invention relates to a windshield and more particularly to a windshield form of a plurality of transparent plates or sheets, such as glass, said plates being capable of being positioned at various angles relative to each other and even wholly out of the visual range of the occupants as by being disposed and laid over on the cowl.

Prior to this invention, automobile windshields were formed of one or more sheets of glass disposed in a rigid frame. Frequently, in riding and particularly on warm days, it is desirable to have the cool breezes produced by driving enter the interior of the car. With windshields used prior to this invention, this was secured by elevating the windshield similarly to raising a window. Due to the structure of the vehicle body and the rigid frame in which the windshield was positioned, the windshield could only be raised a small amount, not over approximately six inches. As a consequence, the lower edge of the windshield was more or less directly in line with the driver's vision and was a source of great inconvenience to the driver. Under no condition could the windshield be so positioned that it was outside of the driver's line of vision and permit the entry of the desired cool breezes.

I have found that by making a windshield of two transparent plates, such as glass, hingedly secured at their adjacent edges and pivotally, and preferably also slidably, mounting the plates adjacent the opposite edges, the windshield may be moved so as to permit the entry of the air currents produced during driving into the interior of the car without interfering with the driver's vision and even permit disposing the windshield wholly out of the driver's vision.

It is therefore an object of this invention to provide a windshield which is so constructed and mounted on the car that it may be wholly removed from the driver's vision.

Another object of this invention is to provide a windshield formed of a plurality of transparent plates hingedly secured at the adjacent edges, whereby the plates may be disposed at any angle relative to each other, said windshield being pivotally and preferably also slidably mounted on the car whereby it may be disposed out of the driver's vision as by being laid down on the cowl.

Other objects will appear from the following description, appended claims and accompanying drawings in which:

Figure 1:
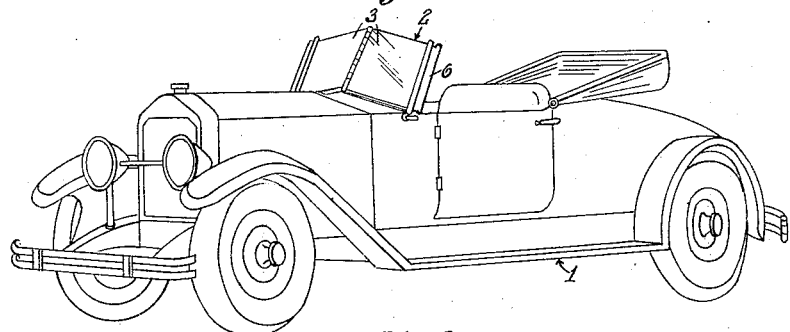
Figure 1 is a perspective view of a vehicle, such as an automobile, illustrating the windshield constituting this invention mounted thereon.
Figure 2:
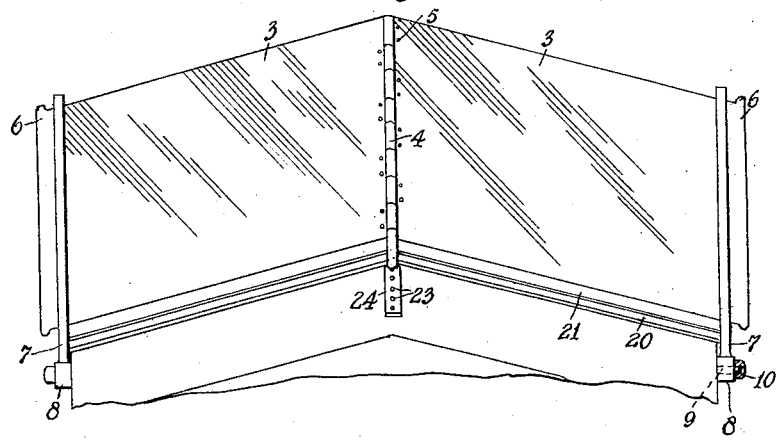
Figure 2 is a front elevation of the windshield mounted on a vehicle.

Referring now to the drawings wherein like numerals designate like parts, the reference numeral 1 designates a vehicle, such as an automobile of any suitable structure or design, having a windshield 2 mounted thereon in accordance with this invention. Since the details of construction of the automobile body form no essential part of this invention, further description thereof is deemed unnecessary.

The windshield 2 is formed of two plates 3 of transparent material, such as glass. These plates are pivotally secured together at the adjacent edges thereof, whereby they may be disposed at various angles to each other. It is apparent that the plates 3 may be joined together in various ways. In the drawings this is shown as being attained by means of a hinge 4 to which the plates 3 are fastened in any convenient manner as by screws 5 or the like. At the opposite edges, each of the plates 3 is provided with an enlargement 6, such as a bead or flange, the purpose of which will become apparent from the following description.

Figure 5:
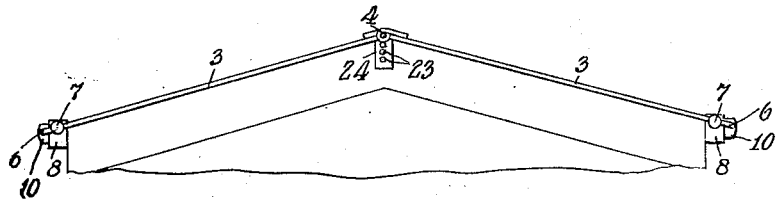
Figure 5 is a front elevation of the windshield as it appears when it is disposed on the cowl.
Figure 9:
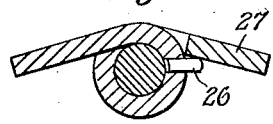
Figure 9 is a sectional view of the hinge securing the two plates together.

According to this invention, each of the plates 3 adjacent the enlarged edge 6 thereof is mounted as hereafter more fully described in a support 7 which is provided with a bearing 8 at its lower end by means of which it is pivotally mounted on a fixed pin shaft 9. As is apparent, upon movement of the supports 7 about the shafts 9, the plates 3 will be correspondingly rotated. The windshield may be rotated until it is disposed on the cowl of the machine and by reason of the hinge 4 the plates 3 may be positioned so that they substantially conform to the shape of the cowl as illustrated in Figure 5.

It is apparent that irrespective of the position of the windshield, the supports 7 must be restrained from movement about the shaft 9. With this in view each of the shafts 9 is, on the free end thereof, threaded and made to cooperate with a hollow and interiorly threaded element 10 which, when screwed home, seats itself on the bearing 8 and locks the supports 7 in position. In order to facilitate the usual locking and unlocking action, the element 10 is provided with a handle 11, preferably of such a contour as to harmonize with the design of the automobile or any of its parts. If desired, a lock washer may be interposed between the element 10 and the face of the bearing 8.

When the windshield is to be positioned out of the driver's vision, it is necessary, as above stated, to rotate the windshield and dispose it on the cowl. During this positioning on the cowl the length of the windshield between the supports 7 varies and hence it is essential to so construct the said supports that they can readily and easily accommodate and permit the increase or decrease in the dimension of the windshield therebetween. Inasmuch as the movement also involves a change in angular disposition of the windshield, the supports should preferably also be designed to take care of this.

Figure 8:
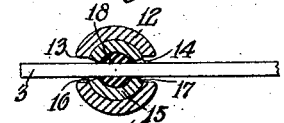
Figure 8 is a sectional view of the means by which the windshield is pivotally and slidably mounted on the car.

According to the instant invention, these results are achieved by making each of the supports 7 of a tubular member 12 provided with oppositely disposed and aligned slots 13 and 14, through which the plates 3 pass. On the interior of said tubular member and concentric therewith there is disposed a similar tubular member 15. This member 15 is also provided with slots 16 and 17 slightly smaller than the slots 13 and 14 and in normal position in alignment therewith as shown in Figure 8. As is evident, this structure permits sliding of the plates through the supports.

The widths of the slots are of such dimensions as will permit the desired angular disposition of the plates. If desired, the inner tubular member 15 may be rotatably disposed in the tubular member 12 and rotation thereof secured when the angle of the plates is changed. The rotation may be more readily obtained by disposing any suitable means, such as rubber pads 18, to frictionally engage both the plates 3 and the inner tubular member 15. As an alternative, the tubular member 15 may be rigidly disposed and the frictionally engaging means 18 may be made rotary. The pads 18 also serve to eliminate any rattle between the parts and particularly between the plates 3 and supports 7.

Figure 4:
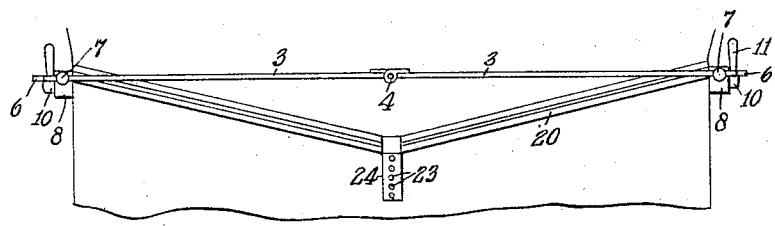
Figure 4 is a plan view of one of the positions which the windshield may assume.

In cold weather it is desirable to have the windshield so mounted that it will not permit the ingress of air into the interior of the car and the present invention contemplates means cooperating with the windshield for accomplishing this result. One satisfactory structure comprises a pad 19 formed of a suitable material, such as rubber or felt, disposed in a channel 20 extending across and secured to the top of the cowl as indicated in Figure 4. The pad 19 is provided with a seat 21 on which the lower edges of the plates 3 are positioned to form an airtight joint.

There are also times when it is desirable to permit the entry of a small portion of the breezes into the car. By this invention this is secured by unseating the lower edges of the plates from the pad 19 thereby forming a space, constituting an air inlet, between the upper surface of the cowl and the lower edge of the windshield. Usually, this is effected by decreasing the angle between the plates 3 and advancing the apex thereof forwardly.

When the windshield is in an upright position it is desirable to lock it in the predetermined position. Otherwise, due possibly to the wind and other causes, it cannot be maintained in the desired position. As an example of one satisfactory arrangement for locking the windshield in position, the hinge 4 is provided at its lower end with a spring-pressed pin 22 which is adapted to cooperate and enter one of a series of holes 23 formed in a plate 24 secured to the cowl. The pin 22 is provided with a finger portion 25 extending through a slot in the hinge whereby, upon upward movement thereof, the pin may be disengaged from the hole in which it is projected. After the adjustment of the plates to the desired position, the finger portion 25 is released whereby the pin 22 enters the appropriate hole and locks the windshield in position. The hinge 4 may also be provided with a pin 26 which cooperates with the part 27 and serves to limit the upward movement of the hinge.

The windshield may be very easily and readily assembled as follows: After the supports 7 with their cooperating parts therein have been pivotally mounted on the body, the plates 3 are slid through the slots and the adjacent edges thereof secured by the hinge 4.

The enlarged edges 6 limit the sliding movement of the plates in one direction.

Figure 3:
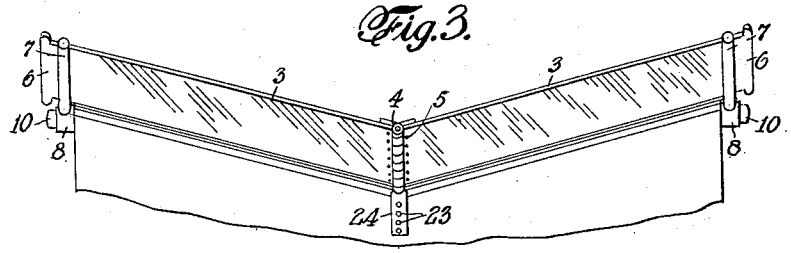
Figure 3 is a plan view of the windshield illustrated in Figure 2.
Figure 6:
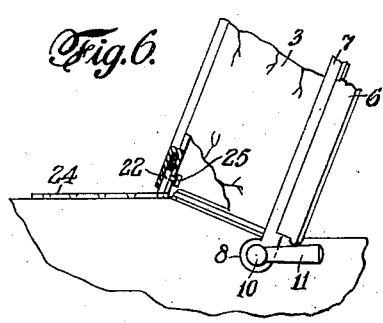
Figure 6 is a side elevation of the windshield and also showing the hinge locking means.
Figure 7:
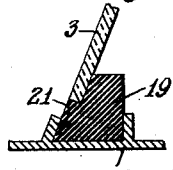
Figure 7 is a detail in section illustrating one manner in which the windshield may be disposed.

After the windshield has been so assembled, it may be disposed, as desired. For example, it may be disposed as shown in Figure 4 or the plates thereof may be angularly positioned relative to each other. If the windshield is to be disposed as illustrated in Figure 3, the pin 22 is raised and the windshield advanced forwardly until the desired position is secured, i. e. until the plates seat themselves on the pad 19. The pin 22 is then released and it then enters the desired hole 23 locking it in position. The enlarged edges 6 of the plates 3 prevent the withdrawal of the plates from the supports 7.

If, for any reason, it is desired to have the air currents enter the car, the pin 22 is disengaged from the hole 23 and the windshield moved forwardly so that it will be spaced from the pad 19, whereby a space between the cowl and the windshield is produced. The pin 22 is then released and it enters the appropriate hole 23.

If it is desired to lay the windshield on the cowl, the handles 11 are actuated to permit rotation of the supports 7. The pin 22 is then disengaged from the hole 23 in which it was disposed and the entire windshield rotated in a forward direction. Upon contact with the cowl, the plates 3 tend to assume a position corresponding thereto, after which the handles 11 are turned to lock the windshield in place. The pin 26 and the element 27 of the hinge prevent excessive movement of the plates.

During the various movements above described, the windshield slides in the supports 7 as necessary. Due to the details of construction of said supports and particularly the rotary elements thereof, the various angular positions of the plates may be easily and readily secured.

From the foregoing it is apparent that I have provided a windshield which in addition to being variously disposed in the driver's vision can also be wholly positioned outside the driver's vision.

Since it is obvious that various modifications and changes may be made in the above described apparatus, I do not intend to limit this invention to the exact details described except as defined in the appended claims.

I claim:

1. A windshield comprising a pair of transparent plates, means to pivotally secure the plates together at the adjacent edges thereof, slotted members pivotally mounted on the vehicle, said plates extending through and having their sides slidably engaged by said slotted members for the purpose of permitting relative sliding action between the plates and slotted members.

2. A windshield comprising a pair of transparent plates, each of said plates having an enlarged edge, means to pivotally secure the plates together at the adjacent edges thereof, slotted members mounted on the vehicle and slidably carrying the plates, the enlarged edges being too large to pass through the slotted members, and means to pivotally mount said members on the vehicle.

3. A windshield comprising a pair of transparent plates, each of said plates having an enlarged edge, means to pivotally secure the plates at the adjacent edges thereof, a pivotally mounted tubular member having aligned slots therein, a second tubular member rotatably disposed in the first tubular member and having slots normally in alignment with the slots of the first mentioned tubular member, the plates adjacent the enlarged edges thereof being disposed in said slots, and means to frictionally secure the plates to said second tubular member.

4. A windshield comprising a pair of spaced supports pivoted to swing from upright to prostrate position, a pair of transparent plates, each mounted on one support to swing with and move transversely of its support, the plates extending toward each other and having their adjacent edges pivoted together with the axis of the pivot lying in an upright plane.

5. A windshield comprising a pair of spaced supports pivoted to swing from upright to prostrate position, a pair of transparent plates, each mounted on one support to swing with and move transversely through its support, the plates extending toward each other and having their adjacent edges pivoted together with the axis of the pivot lying in an upright plane.

6. A windshield comprising a pair of spaced supports pivoted to swing from upright to prostrate position, a pair of transparent plates, each mounted on one support to swing with and move transversely of its support, the plates extending toward each other and having their adjacent edges pivoted together with the axis of the pivot lying in and adapted to swing in an upright plane.

7. A windshield comprising a pair of spaced supports pivoted to swing from upright to prostrate position, a pair of transparent plates, each mounted on one support to swing with and move transversely of its support, the plates extending toward each other and having their adjacent edges pivoted together with the axis of the pivot lying in and adapted to be displaced substantially parallel to itself in an upright plane.

8. A windshield comprising a pair of spaced supports pivoted to swing from upright to prostrate position, a pair of transparent plates, each mounted on one support to swing with and move transversely of its support, the plates extending toward each other and having their adjacent edges pivoted together with the axis of the pivot lying in and adapted to swing in and be displaced substantially parallel to itself in an upright plane.

9. A windshield comprising a pair of spaced supports pivoted to swing from upright to prostrate position, each support having a hollow interior, means rotatably mounted in said hollow interior, a slot extending transversely through each support and rotatable means, a pair of transparent plates, each extending through the slot in one support and rotatable means, to swing with and slide transversely of its support, the plates extending toward each other and having their adjacent edges pivoted together with the axis of the pivot lying in an upright plane.

10. A windshield comprising a pair of spaced supports pivoted to swing from upright to prostrate position, each support having a hollow interior, pad means rotatably mounted in said hollow interior, a slot extending transversely through each support and rotatable pad means, a pair of transparent plates, each extending through the slot in one support and rotatable pad means, to swing with and slide transversely of its support, the plates extending toward each other and having their adjacent edges pivoted together with the axis of the pivot lying in an upright plane.

In testimony whereof, I have affixed my signature to this specification.

RAYMOND G. F. LOEWY.